Sept. 22, 1925. 1,554,725
I. S. HOCHREITER
LOADING MACHINE
Filed Feb. 19, 1923 10 Sheets-Sheet 5

Sept. 22, 1925.  1,554,725

I. S. HOCHREITER

LOADING MACHINE

Filed Feb. 19, 1923  10 Sheets-Sheet 8

Inventor
I. S. Hochreiter,
By
Attorney

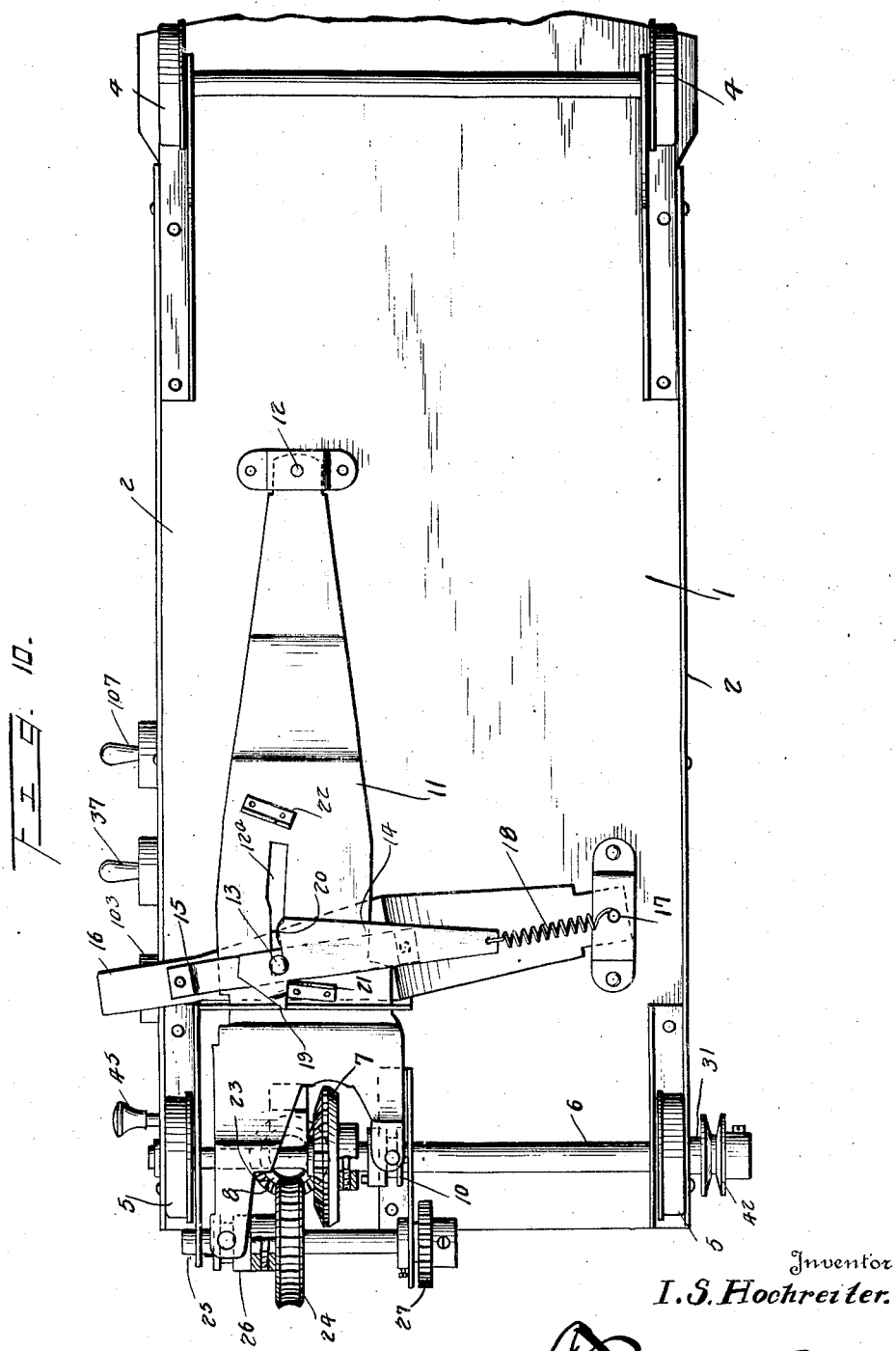

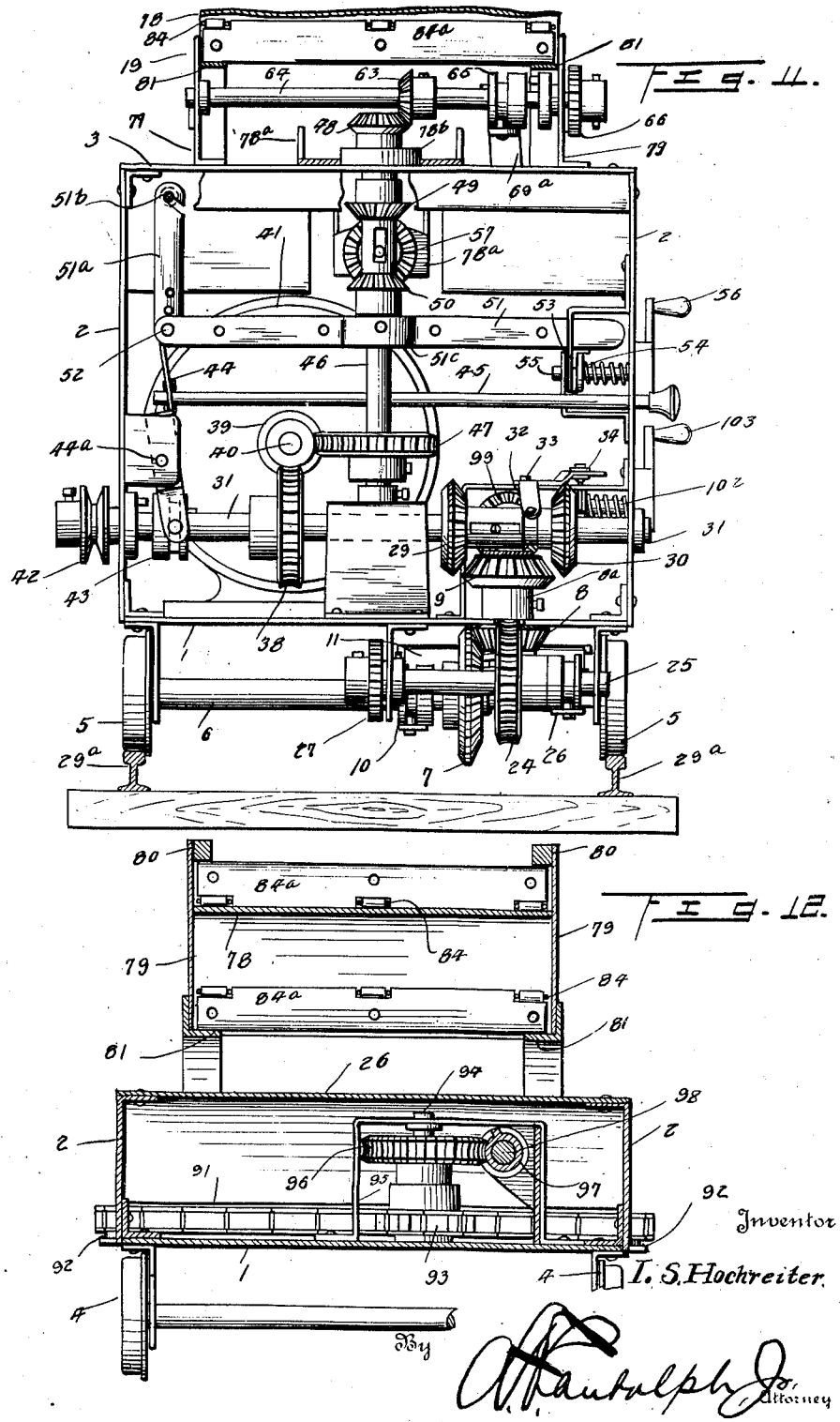

Patented Sept. 22, 1925.

1,554,725

UNITED STATES PATENT OFFICE.

ISIDOR S. HOCHREITER, OF LUZERNE, PENNSYLVANIA.

LOADING MACHINE.

Application filed February 19, 1923. Serial No. 619,943.

*To all whom it may concern:*

Be it known that I, ISIDOR S. HOCHREITER, a citizen of the United States, residing at Luzerne, in the county of Luzerne and State of Pennsylvania, have invented certain new and useful Improvements in Loading Machines; and I do hereby declare the following to be a full, clear, and exact description of the invention, such as will enable others skilled in the art to which it appertains to make and use the same.

In mining operations of various kinds, a considerable item of expense results from the handling of the material and particularly the loading of the same when blasted.

The primary object of the present invention is the provision of a machine for loading the material, rocks, earth, coal, mineral and the like, according to the particular work in hand, into a car and which may be readily advanced to pick up the load, withdrawn to be out of the way when mining and blasting, adjusted laterally and vertically to gather and pick up the material and which may be reduced in length for convenience when moving the machine from place to place.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Figure 1:
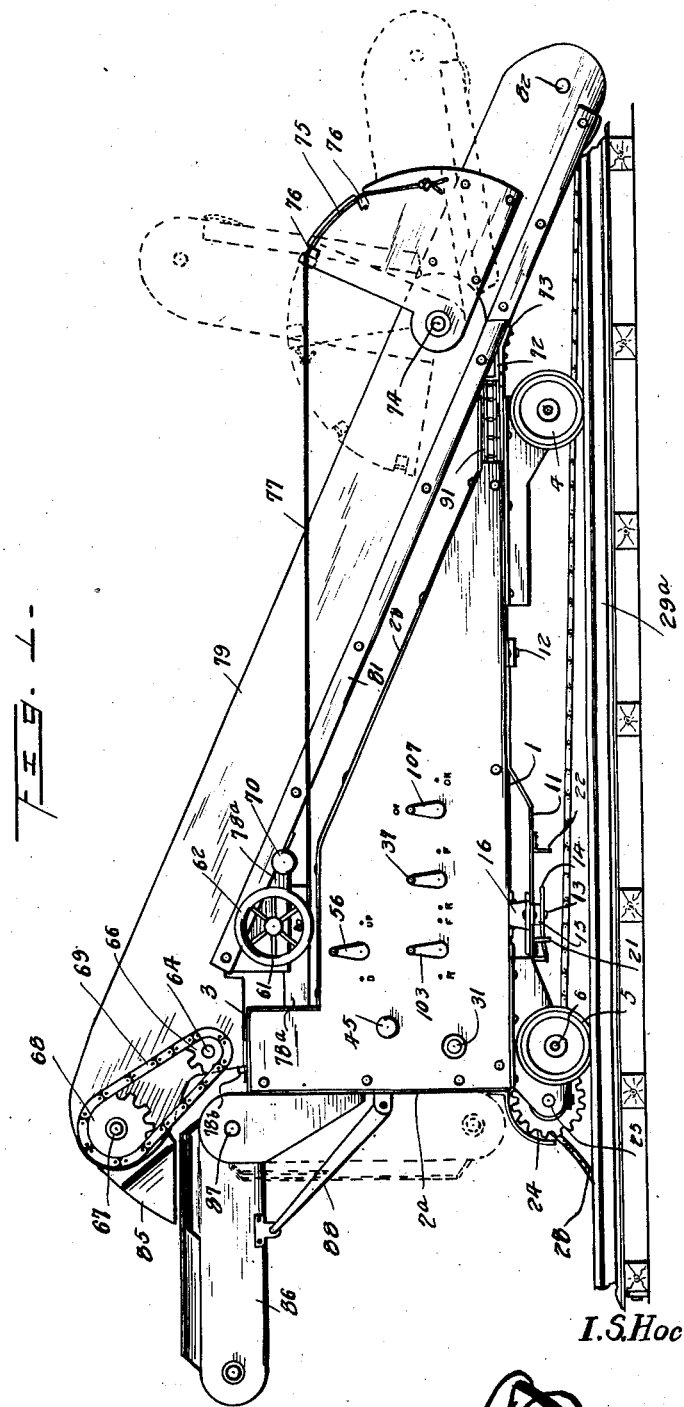
Figure 2:
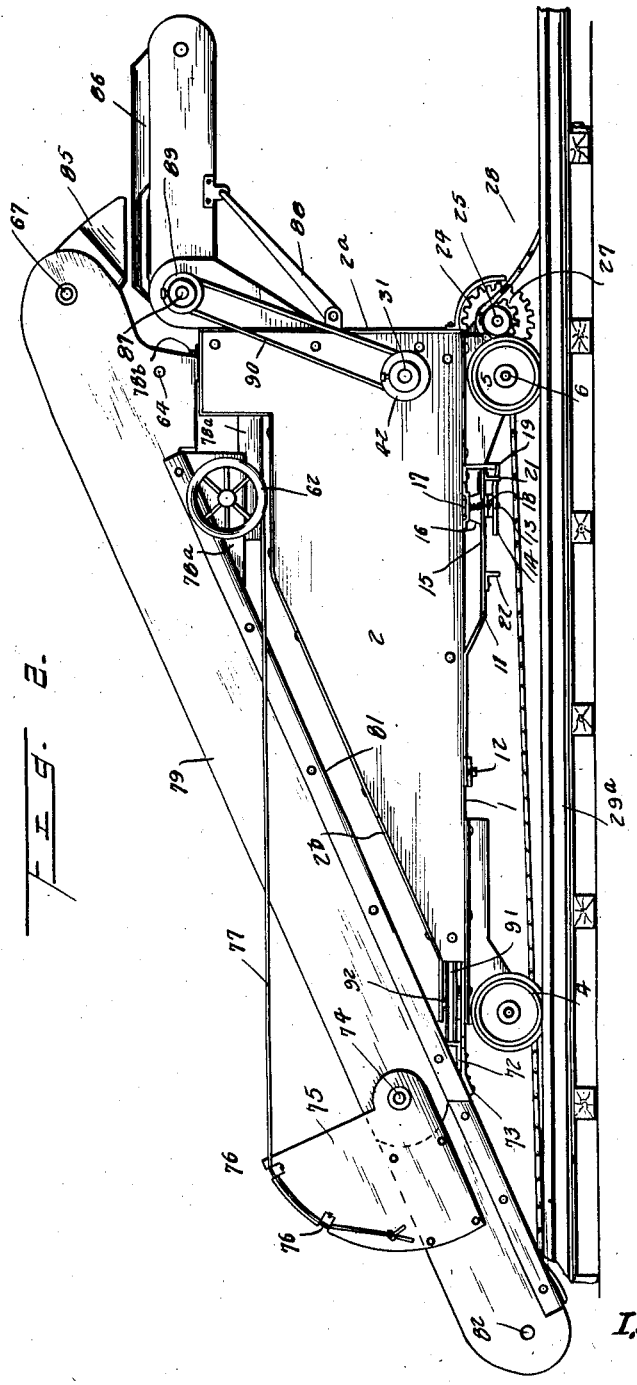
Figure 3:
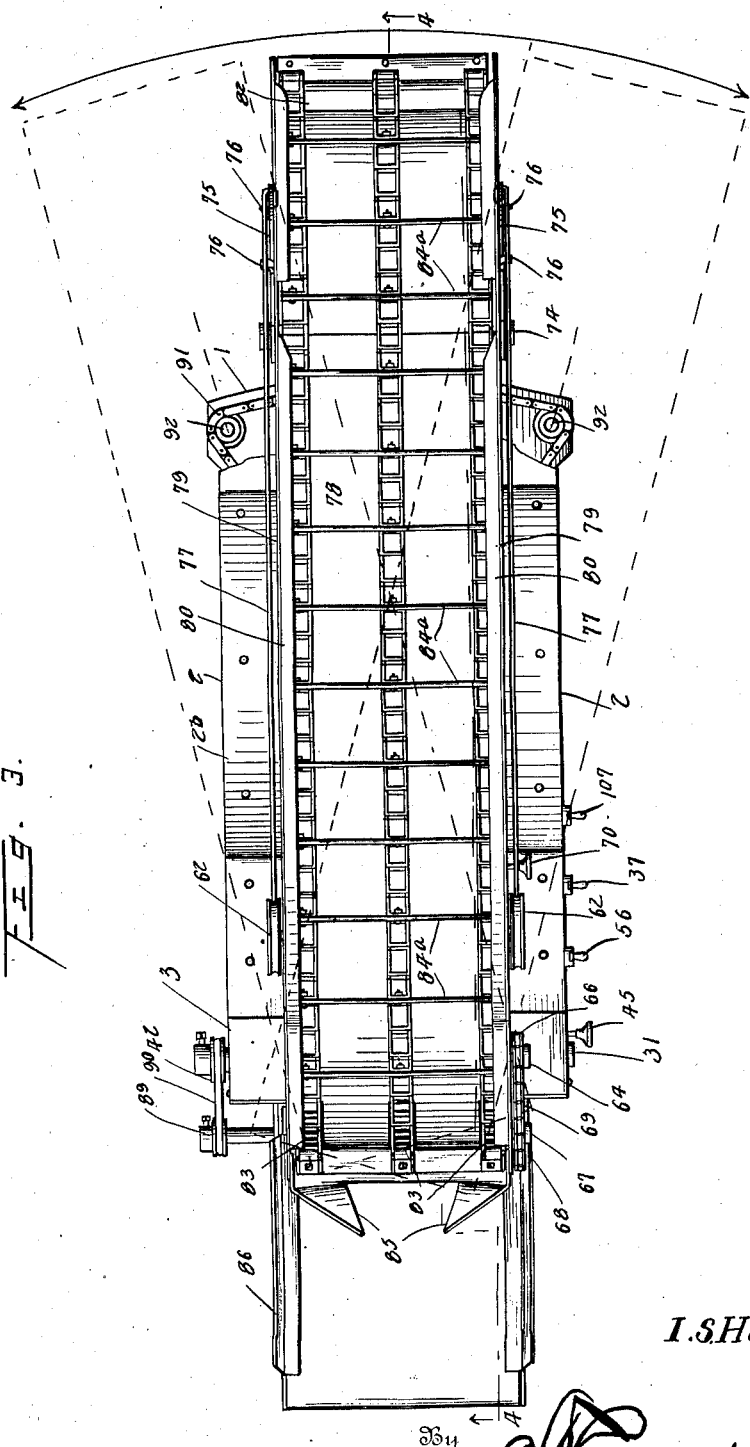
Figure 4:
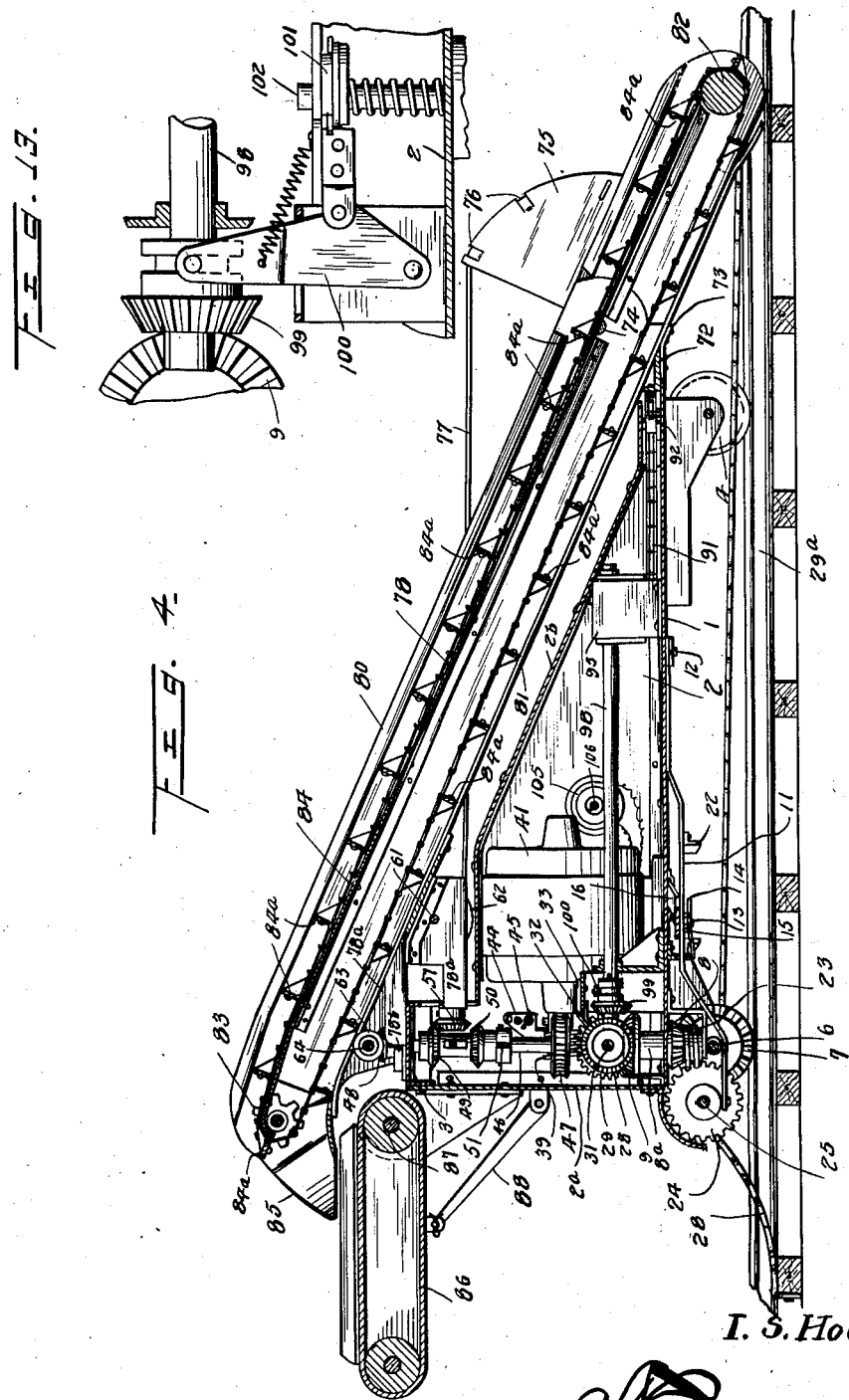
Figure 5:
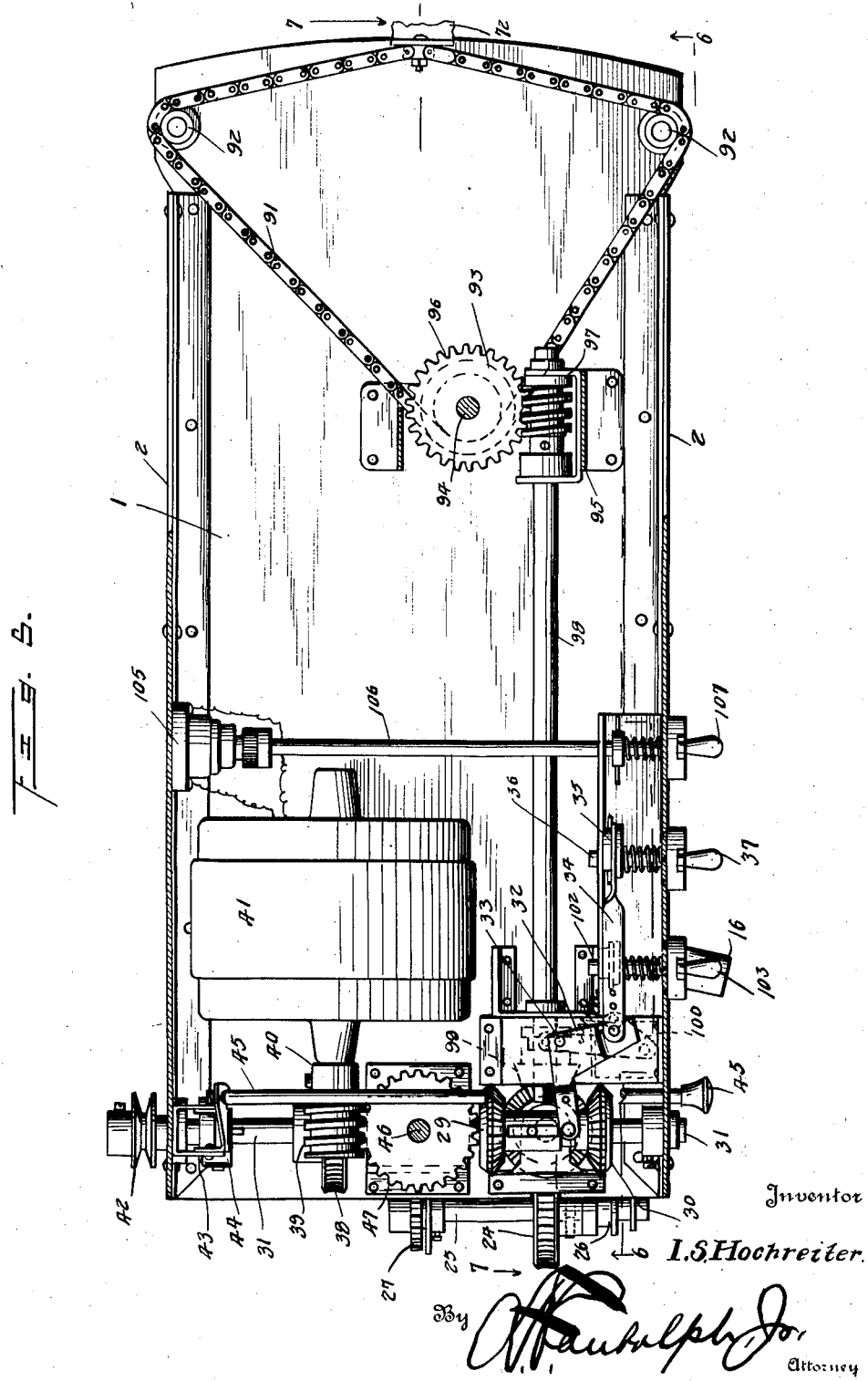
Figure 6:
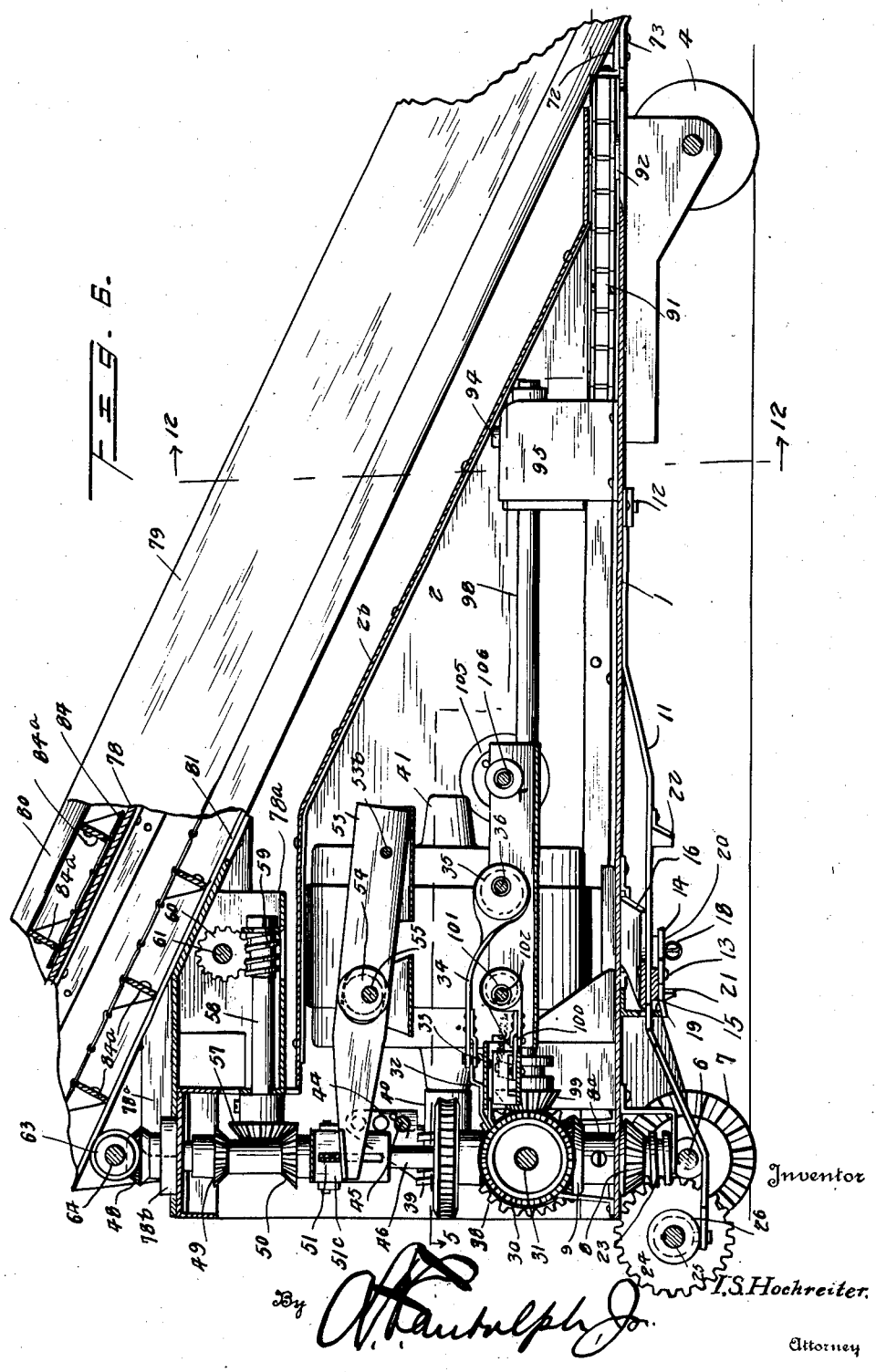
Figure 7:
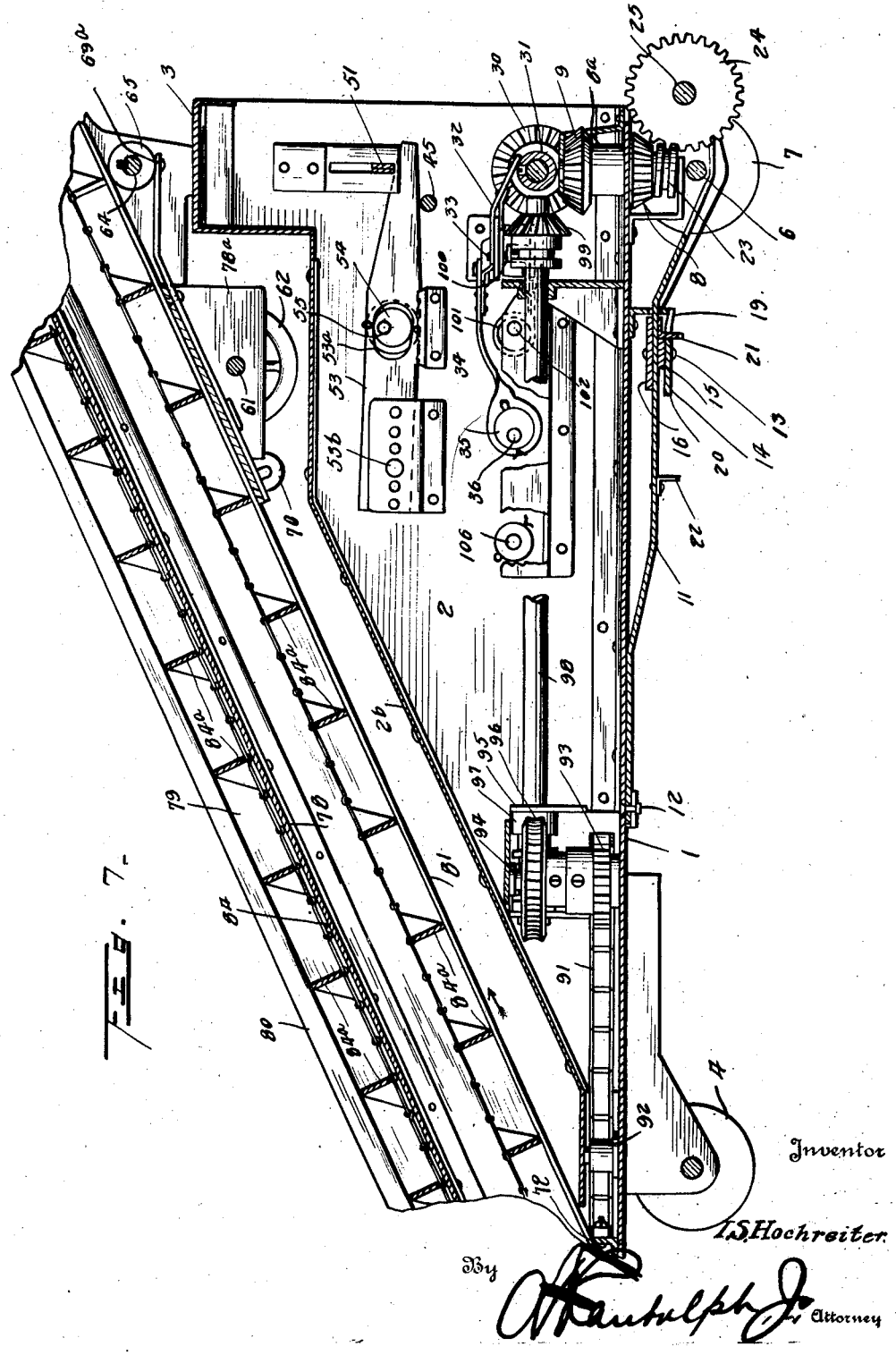
Figure 8:
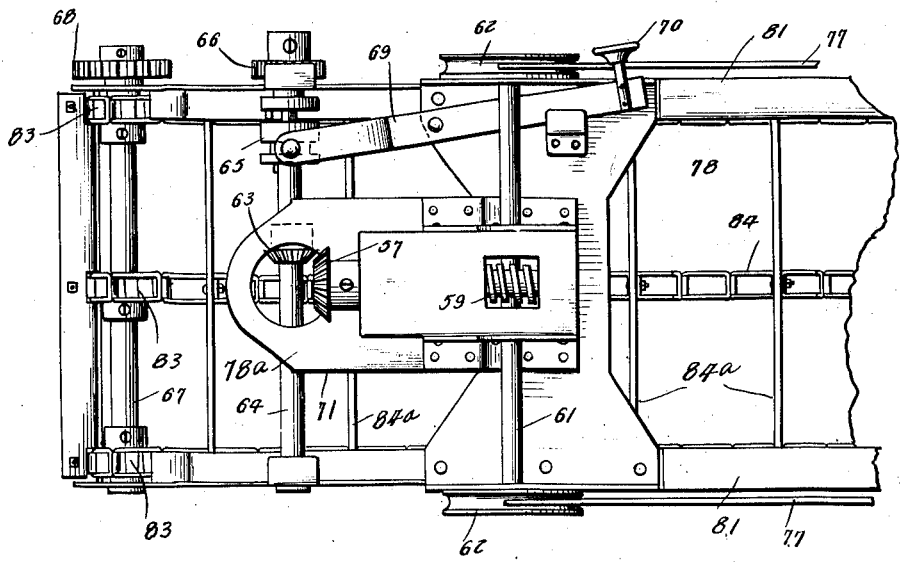
Figure 9:
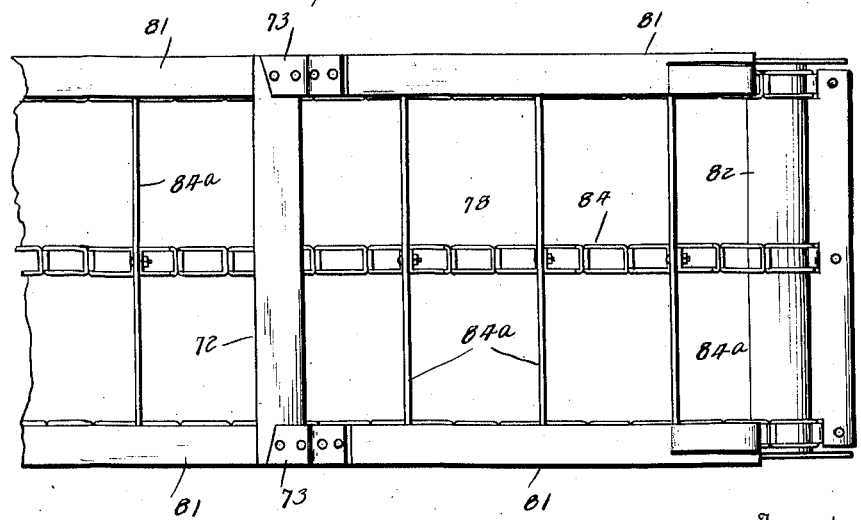

Referring to the accompanying drawings forming a part of the application:

Figure 1 is a side view of the loading machine embodying the invention, the dotted lines showing different positions of the load gatherer and pick up of the elevator and the folded position of the conveyor, Figure 2 is a view similar to Figure 1 of the reverse side of the machine, Figure 3 is a top plan view, Figure 4 is a vertical longitudinal section on the line 4—4 of Figure 3, looking in the direction of the arrows, Figure 5 is a horizontal section on the line 5—5 of Figure 6, Figure 6 is a vertical section on the line 6—6 of Figure 5, looking in the direction of the arrows, Figure 7 is a vertical longitudinal section on the line 7—7 of Figure 5, looking in the direction of the arrows, Figure 8 is a view of the rear portion of the elevator inverted, the chute being omitted, Figure 9 is a view of the front portion of the elevator inverted, Figure 10 is a view of the main frame inverted to show more clearly the bottom and the parts applied thereto, Figure 11 is a rear end view, the delivery end of the elevator being broken away, Figure 12 is a vertical transverse section on the line 12—12 of Figure 6, looking to the right as indicated by the arrows, and Figure 13 is a detail view of the means for throwing the lateral adjusting mechanism of the elevator into and out of gear, the parts being shown on a larger scale.

Corresponding and like parts are referred to in the following description and designated in the several views of the drawings by like reference characters.

The main frame of the machine comprises a bottom 1, sides 2 and a rear elevated crosspiece 3, the upper edges of the forward portions of the side pieces 2 being inclined to correspond with the inclination of the elevator which inclines upwardly and rearwardly from the lower receiving end. The main frame is mounted upon front wheels 4 and rear wheels 5, the latter constituting drivers to admit of the machine being self-propelling. The rear axle 6 has the drive wheels 5 fast thereto and a bevel gear 7 is loose thereon and is in mesh with a companion bevel gear 8 fast to the lower end of a vertical shaft, to the upper end of which a bevel gear 9 is secured in any preferred way to effect simultaneous rotation of the bevel gears 8 and 9. A clutch member 10, rotatable with the axle 6, is engaged by an extension of a lever 11 which is pivoted at 12 to the bottom 1 of the main frame. A longitudinal slot 12$^a$ provided in the lever 11 receives a pin 13 upon which is mounted a latch 14 and which connects a keeper 15 and lever 16 disposed upon opposite sides of the lever 11 and which controls the machine or apparatus, the lever 16 being pivoted at 17 to the bottom 1. A contractile helical spring 18 connects one end of the latch 14 with the pivot 17, thereby admitting of the latch having a yielding movement. The latch 14 has oppositely disposed stops 19 and 20 which are adapted to coact with corresponding stops 21 and 22 carried by the lever 11 and disposed at opposite ends of the longitudinal slot 12ª. The vertical shaft provided with the bevel gears 8 and 9 also carries a worm 23 which is in mesh with a worm wheel 24 loose on a shaft 25 paralleling the rear axle 6 and journaled in bearings applied to the bottom 1. A clutch member 26, rotatable with the shaft 25, is engaged by an extension of the lever 11 and is adapted to clutchingly engage the worm wheel 24, whereby to cause it and the shaft 25 to rotate. A sprocket wheel 27 fast to the shaft 25, coacts with a sprocket chain 28 which passes thereover to effect positive movement of the machine forwardly or rearwardly, as required. It should be stated that the machine is mounted upon a track 29ª and the sprocket chain 28 extends lengthwise of the track for some considerable distance and is attached at its ends thereto. When the shaft 25 is rotated and the lever 11 is moved to clutchingly engage the worm wheel 24 therewith, the sprocket wheel 27 is correspondingly rotated and by reason of its engagement with the sprocket chain 28, the machine is positively moved either forwardly or rearwardly according to the direction of rotation of the shaft 25, which is determined by the direction of rotation of the bevel gear 9.

Connected bevel gears 29 and 30 rotatable with a transverse shaft 31 are disposed upon opposite sides of the bevel gear 9 and are movable to bring either into meshing engagement with the bevel gear 9 to cause the same to rotate either to the right or to the left, as required. A lever 32 pivoted at 33 is adapted to effect a shift of the bevel gears 29 and 30. The lever 32 is of bell crank form—Figure 5—and a link 34 pivoted thereto at one end has its opposite end in engagement with an eccentric 35 secured to a shaft 36 which projects at one end and is provided with a suitable crank 37. A worm wheel 38 fast to the shaft 31 is in mesh with a worm 39 rotatable with the shaft 40 of a suitable motor 41, which is preferably of the electric type. A pulley 42 loose on a projecting end of the shaft 31 and mounted in a side piece 2 of the main frame, is adapted to be clutched to the shaft 31 so as to rotate therewith. For this purpose, a clutch member 43, splined to the shaft 31, is provided and is engaged by a lever 44 with which a rod or like part 45 cooperates and projects beyond a side of the main frame and terminates in a suitable grip.

A vertical shaft 46, provided with a worm wheel 47 fast thereto and in mesh with the worm 39, is provided at its upper end with a bevel gear 48 which is fast thereto and with connected bevel gears 49 and 50 rotatable with the shaft and having a limited longitudinal movement thereon. A transverse lever 51, pivoted at 52, is adapted to be operated by a suitable connection 53 and eccentric 54 in cooperative relation therewith and fast to a shaft 55 projecting at one end and provided with a suitable handle 56. A longitudinal shaft 58 is provided at one end with a bevel gear 57 and at its opposite end with a worm 59. The bevel gear 57 is disposed between the bevel gears 49 and 50 and by proper manipulation of the handle 56, one or the other of the bevel gears 49 and 50 may be brought into meshing engagement with the bevel gear 57 on shaft 58, whereby to rotate the shaft 58 to the right or to the left, as required. A worm wheel 60 in mesh with the worm 59 on shaft 58 is fast to a transverse shaft 61 which is provided at opposite ends with grooved pulleys 62. Rotation of the shaft 61 in one direction or the other effects a raising or a lowering of the gathering or pick up end of the elevator. The bevel gear 48 at the upper end of the shaft 46 is in mesh with a companion bevel gear 63 fast to a transverse shaft 64 upon which is splined a clutch member 65 adapted to clutchingly engage a sprocket 66 loose upon the shaft 64 and mounted in the frame of the elevator. A shaft 67 at the upper rear end of the elevator is provided at one end with a sprocket wheel 68 which is connected by means of a sprocket chain 69 with the sprocket wheel 66, whereby to transmit motion from the shaft 64 to the shaft 67. A lever 69ª, pivoted intermediate its ends, engages the clutch member 65 at one end and is provided at its opposite end with a button 70, which provides convenient means for operating the lever 69ª and the clutch member 65 to throw the elevator into or out of gear. The elevator inclines to the horizontal in an upward and rearward direction from its gathering or pick up end which latter is pivoted and adjustable vertically at its receiving end. The elevator is mounted to swing about a vertical axis in line with the shaft 46 and its rear portion is provided with a bracket 78ª which receives the upper end of the shaft 46 and rests upon the elevated crosspiece 3 of the main frame. The bracket 73ª preferably consists of a plate having longitudinal flanges and an opening to receive a ring 78ᵇ on the top of the crosspiece 3. This forms a turntable arrangement in line with the shaft 46 about which the elevator turns when its forward end is swung laterally. The lower forward portion of the elevator is provided with a cross bar 72 which rests upon the front portion of the bottom 1, as indicated most clearly in Figure 4. The forward edge of the bottom 1 is formed on the arc of a circle whose center coincides with a prolongation of the axis of the elevator, as shown most clearly in Figure 3. Stops 73 applied to opposite sides of the elevator engage the curved end of the bottom 1 and sustain the stress incident to engagement of the receiving end of the elevator with the material to be loaded. The elevator comprises a main section and a pivoted section, the latter corresponding with the gatherer or pick up. The two sections are pivoted at 74 and the pivoted section is provided at opposite sides with quadrants 75 which have lateral hooks 76 about their curved edges to receive cables 77 which are secured at one end to the quadrants 75 and at the opposite end to the pulleys 62 about which they are wound to effect a pivotal movement of the receiving end of the elevator, whereby to raise or lower the same as required. The hooks 76 prevent lateral displacement of the cables and enable automatic engagement and disengagement of the cables with portions of the quadrants as the pivoted section of the elevator is adjusted. The two sections of the elevator are of similar construction, each comprising a bottom 78, sides 79, guides 80 along the upper edges of the sides and guides 81 along the lower edges of the sides. A roller 82 is provided at the receiving end of the elevator and the shaft 67 is located at the upper delivery end is provided with a plurality of sprocket gears 83. An endless conveyor 84 passes around the roller 82 and the sprocket wheels 83 and may be of any construction and, as shown, the same comprises a plurality of sprocket chains and connecting lags or strips which engage the material and move the same over the bottom 78. The endless conveyor is driven by motion imparted to the shaft 67 in the manner herein stated. A chute 85 disposed at the delivery end of the elevator directs the material to a conveyor 86, by means of which it is discharged into a car or other receptacle, not shown. The conveyor 86 is pivoted upon a transverse shaft 87 and is supported in operative position by means of braces 88 interposed between the main frame and the frame of the conveyor. When it is required to reduce the length of the machine, the conveyor 86 may be folded against the rear end of the machine, as indicated by the dotted lines in Figure 1. A pulley 89 fast to a projecting end of the shaft 87 is connected by means of a drive belt 90 with the pulley 42. The conveyor 86 is adapted to be thrown into or out of action by means of the clutch member 43 which is operable by manipulating the rod 45 in the manner stated.

The receiving end of the elevator is adapted to be moved laterally as required according to the position of the material to be loaded, and for this purpose a sprocket chain 91 is provided and is attached to the crossbar 72 at a middle point and passes around guide pulleys 92 adjacent the forward corners of the bottom 1 and around a sprocket wheel 93 loose upon a vertical shaft 94 mounted in a bracket 95 attached to the bottom 1. A worm wheel 96, connected with the sprocket wheel 93 and loose on the shaft 94, is in mesh with a worm 97 fast to a longitudinal shaft 98 mounted upon the bottom 1 and provided at its rear end with a bevel gear 99 splined thereto and movable into and out of engagement with the bevel gear 9. A lever 100 engages the grooved hub of the bevel gear 99 and is connected with an eccentric 101 carried by a shaft 102, the projecting end of which is provided with an operating handle 103 which, by proper manipulation, throws the bevel gear 99 into or out of engagement with the bevel gear 9, whereby to move the receiving end of the elevator to the right or left, as required.

The current to the electric motor 41 is controlled by means of a switch 105 and this switch is controlled by means of a rod 106 which projects at one end and is provided with a suitable operating handle 107 which, when moved, enables the switch 105 to be operated to supply or cut off the current from the motor.

To protect the various gear trains and mechanism above described, from dust, dirt, water and other extraneous material which is always present in work such as my invention is designed to accomplish, it will be noted that I have contrived to enclose nearly all the mechanism, including the motor 41 and the various transmission trains of gearing operated thereby, within a housing, comprising the bed or bottom plate 1, the sides 2, an end plate 2ª, and an inclined rearwardly extending deck 2ᵇ, the upper end of which deck joins the angular crosspiece 3. The end plate 2ª is removable to permit access to the machinery within the housing, for repairs, lubrication, or other attention.

*Operation.*

When driving a passageway from a lower level to an upper one, as in mining, the excavated material is deposited in a pile on the usual track 29ª running along such lower level, and one of the many uses for which my invention is designed, is the expeditious removal of such material.

Previously to commencing the excavation, the traction chain 28 may be laid between and substantially parallel with the rails 29ª of the track, at the point where the excavated material is to be piled, the forward end of the traction chain being securely fastened, preferably to the roadbed at a point beyond the spot where the material will be piled.

The loading machine, which has been lowered in the usual cage to the tracks in such lower gangway, is rolled or driven onto the tracks, either by other power or under its own power.

Assuming that it is to travel under its own power the motor 41 is started, the lever 16 (Fig. 10) controlling the clutch lever 11, being in neutral or intermediate position.

Assuming that an electric motor is used, the operator would turn the handle 107 projecting from one side 2 of the machine, to throw the switch 105 (Fig. 4) to its "On" position.

The motor 41 turns the drive shaft 40 (Fig. 1) on which is mounted the worm 39 in mesh with worm wheel 38 fast on the counter shaft 31. Shaft 31 also has splined thereon, the opposed reversing bevel gears 29 and 30, controlled from handle 37 (Fig. 5) through shaft 36, eccentric 35, link 34, and bell crank 32.

As it is desired that the machine advance along the tracks 29ᵃ towards the work, the operator turns crank 32 to the right, to slide bevel gears 29 and 30 to the right on shaft 31, (downwardly when viewing Fig. 5) whereby to mesh bevel gear 29 with the intermediate bevel gear 9 on the upper end of the shaft 8ᵃ.

Bevel gear 8 at the lower end of shaft 8ᵃ, (Fig. 6) is in mesh with the bevel gear 7 journaled on the axle 6. Hence, by shifting the clutch control crank 37, power from the motor is transmitted to the bevel gear 7.

Then, grasping the hand lever 16 (Fig. 10), the operator swings it to the right (looking at Fig. 10), from its neutral position, causing the stud 13 to traverse the cam slot 12ᵃ to the right, and thereby shift the yoke-shaped clutch controlling lever 11 to the right (upwardly as viewed in Fig. 10) to engage the clutch member 10 splined on the rear axle 6, with the loose bevel drive gear 7, which thereupon turns the axle 6, and the driving wheels 5 to advance the machine along the track 29ᵃ towards the work.

Arriving in position adjacent the pile of material to be loaded, the operator will disconnect the power from the driving wheels 5, preferably by shifting the lever 16 back to its neutral position, to release clutch member 10 from driving gear 7, after which, the discharging conveyor 86 at the rear end of the machine, is swung upwardly from the vertical position, shown in dotted lines (Fig. 1) to its horizontal position, shown in full lines in Fig. 1, in which latter position it is supported by the braces 88.

The pivoted gatherer at the front end of the elevator is also lowered from its vertical position, shown in dotted lines in Figure 1, to substantially its full line position, in which it forms a prolongation of the elevator.

This is effected as follows: It will be remembered that the worm 39 on the motor drive shaft 40 also meshes with a worm wheel 47 (Figs. 4, 6 and 11) fast on a vertical drive shaft 46, the upper end of which drive shaft projects through the crosspiece 3. The connected bevel gears 49 and 50 are splined on the vertical shaft 46 at a point just below the crosspiece 3, as best shown in Figure 6, such bevel gears lying above and below an intermediate bevel gear 57 fast on a horizontal winding shaft 58, extending longitudinally of the machine, and journaled in bearings formed in the bracket 78ᵃ secured to and depending from the bottom 78 of the elevator, at a point in front of the vertical face of the angular crosspiece 3. The rear end of the shaft 58 projects through a laterally elongated opening in the crosspiece 3 to bring the bevel gear 57 into the path of travel of the connected bevel gears 49 and 50. The worm 59 at the forward end of the winding shaft 58 meshes with worm wheel 60 fast on the cross shaft 61 (best shown in Fig. 8) which cross shaft is conveniently journaled in bearings in the same bracket 78ᵃ, the opposite ends of the cross shaft projecting beyond the sides 79 of the elevator and being equipped with the pulleys 62 connected by the cables 77, with the quadrants 75, which pivotally connect the gatherer or pick up end of the elevator to the body portion thereof.

To lower the pivoted lower end of the elevator from its vertical idle position, the operator turns crank 56 (Figs. 1 and 11) to the right, thereby turning the shaft 55 (Figs. 6 and 7) and with it the eccentric 54 lying within the elongated slot 53ᵃ formed intermediate the ends of a longitudinal lever 53, adjustably pivoted at its forward end at 53ᵇ, to raise the rear end of the lever. The rear end of lever 53 projects beneath the free end of a floating lever 51 (Fig. 11) extending transversely across the machine, the opposite end of which floating lever 51 is adjustably pivoted to a depending hanger 51ᵃ, itself pivotally supported at 51ᵇ.

The vertical drive shaft 46 projects through a ring 51ᶜ formed intermediate the ends of the floating lever 51, which ring supports the sleeve on which the shiftable bevel gears 49 and 50 are mounted, the sleeve being splined on the shaft 46.

Raising the rear end of lever 53 rocks lever 51 upwardly to mesh driving bevel gear 50 with the driven intermediate gear 57, which is thereby turned, and with it the winding shaft 58, worm 59, worm wheel 60, cross shaft 61, and pulleys 62, to unwind the cables 77 and lower the pivoted front end of the elevator to the desired position.

When the pivoted end of the elevator has been sufficiently lowered, the operator will return the crank 56 to its normal position, thereby lowering the bevel gear 50 out of mesh with bevel gear 57, but still maintaining bevel gear 49 out of mesh with gear 57.

It will be remembered that the vertical drive shaft 46 (Fig. 11) deriving its power from the motor through worm 39 and worm wheel 47, and projecting above the crosspiece 3, carries a bevel gear 48 at its upper end in mesh with the bevel gear 63 fast on the cross shaft 64 on which is journaled the drive sprocket 66.

To start the elevating mechanism, the operator forces inwardly the button 70, (Figs. 1 and 8) on the free end of the lever 69ª pivoted intermediate its ends, the opposite end of the lever being connected to a clutch member 65 splined on a cross shaft 64 journaled in brackets depending from the upper rear end of the elevator. Inward thrust on the free end 70 of the lever 69ª rocks the lever to engage the clutch member 65 with a drive sprocket 66 loose on the shaft 64, and connected by a sprocket chain 69 with a larger sprocket 68 fast on a cross shaft 67 journaled in the sides 79 of the elevator. Cross shaft 67 carries the sprocket wheels 83 (Figs. 4 and 8) within the elevating chute 78, 79, which drive the elevating sprocket chains 84, the latter being equipped with the flights or buckets 84ª.

The discharging conveyor 86 is operated from the driving cross shaft 31 (Figs. 2, 3 and 11), one end of which projects beyond the side wall 2 of the machine and carries a loose pulley 42 connected by a belt 90 with a pulley 89 fast on the conveyor drift shaft 87. By pulling outwardly on the rod 45 (Fig. 11), the clutch lever 44, pivoted at 44ª, is rocked to throw the clutch 43 splined on drive shaft 31 into engagement with the driving pulley 42 to rotate the latter.

The way has now been laid to the explanation of one of the most important features of my invention.

Heretofore, loading machines have been devised which are stationarily located adjacent the material to be loaded, and the material either fed to the elevator, or in some cases, the elevator may be advanced into the material for a limited distance, but so far as I am aware, there is no loading machine adapted to bodily advance towards the material to be loaded and simultaneously load the material.

I have explained the means driven from the motor 41 for actuating the elevating mechanism, and to effect the continuous advance of the loading machine bodily towards the material, as the elevator removes that portion which is directly in front of the machine, I have provided the traction chain 28, the loose end of which is carried over the sprocket wheel 27, preferably vertically located at about the longitudinal center of the machine at the lower rear end thereof, as shown in Figures 1, 2, 4, 5, 6, 10 and 11. The sprocket wheel 27 is fast on a short horizontal feed shaft 25, on which shaft is also journaled a worm wheel 24, in mesh with a worm 23 (Figs. 4, 6 and 7) fast on the lower end of the vertical reversible shaft 8ª driven from the motor 41, as heretofore explained in connection with the mechanism for driving the wheels 5.

The rear end of the traction chain 28 may now be securely fastened, preferably to the track bed behind the loading machine, so that the chain cannot become disengaged accidentally from the sprocket 27.

The machine is now ready to commence its work, a car or other conveyance (not shown) having been run along the track 129 to a point beneath the overhanging free end of the discharging conveyor 86.

A clutch member 26 (Fig. 10) rotatable with the feed shaft 25 releasably engages the worm wheel 24 to cause the latter to turn the feed shaft 25, such clutch member 26 being operable by one arm of the yoke-shaped clutch-controlling lever 11, the other arm of which operates the clutch 10, heretofore referred to.

The clutch-controlling lever 11 is actuated by the shifting lever 16, the clutches 10 and 26, and lever 11, being so arranged that when one clutch is active, the other is idle.

Everything now being in readiness, and it being assumed that the reversing crank 36 is in such position as to have shifted reversing bevel gears 29, 30, so that motion is transmitted from the motor through intermediate bevel gear 9 to the worm 23 in the proper direction, the operator will shift lever 16 to the left (Fig. 10), from its intermediate neutral position, to cause the pin 13 to traverse the cam slot 12ª and thereby rock the lever 11 to engage the clutch 26 with the worm wheel 24 which imparts motion to the feed shaft 25 and sprocket 27. The latter, gripping the traction chain 28, tends to pull the forward end of the chain backwardly, but since the ends of the chain are securely fastened, the result is to advance the loading machine bodily towards the material to be loaded, the blades or flights 84ª of the elevator cutting into such material and carrying it upwardly along the inclined bottom 78 of the elevator to the upper end where it is discharged between the two opposed confining and guiding wings 85 onto the endless belt 86 of the conveyor which in turn discharges the material from its rear overhanging end into a car or other suitable place.

By operating the reversing lever 37, with its connected mechanism, to shift reversing bevel gears 29, 30 to one limit or the other of their throw, the machine may be caused to advance or back when being propelled either through the worm gearing, sprocket and traction chain, or by the drive wheels 5, 5.

Not only is the material to be removed, which is directly on the track, but also such material that lies along the sides of the track, to effect which I have mounted the elevator so that it may be bodily swung laterally of the machine, as indicated in dotted lines in Figure 3, the axis of movement of the elevator being located near its upper rear end and in line with the axis of drive shaft 46, so that while the gathering foot or receiving end of the elevator is capable of a wide arc of travel, the discharge end travels in a comparatively short arc, to insure that the material elevated will always be delivered onto the conveyor 86, which in this form of my invention does not partake of any lateral swinging movement.

To this end, I mount the elevator frame on a turn-table, best shown in Figures 4, 6, 8 and 11, which may conveniently include the ring 78$^b$ on the top of the bracket 78$^a$ which snugly receives the said ring.

The opening in the forward vertical face of the elevator-supporting crosspiece 3, through which extends the rear end of the adjusting shaft 58 of the gatherer, is provided to enable the shaft 58 to travel with the elevator when the latter is shifted from side to side, while the bevel gear 57 remains in the path of the bevel gears 49 and 50.

The forward lower end of the elevator at a point just above the pivoted foot, rests on the forward end of the bottom 1 of the machine, which forward end is widened and curved to accommodate the lateral swing of the elevator, as indicated in Figure 3.

By supporting the forward lower end of the elevator, the entire weight thereof is distributed, and to render the elevator more rigid in operation, as well as to relieve the turntable of shocks and jars incident to such operation, I equip the underface of the bottom 78 of the elevator with stops or bumpers 73 (Fig. 9) adapted to contact the bottom 1 of the machine, which imparts the thrust caused by the opposition of the material to the advance of the elevator, to the machine as a whole.

When the operator desires to swing the elevator to one side or the other, he turns the crank 103 (Fig. 5) which, through shaft 102, actuated the eccentric 101 linked, as shown in Figure 13, to lever 100, to advance the bevel gear 99 (Fig. 7) splined on the elevator-shifting shaft 98, into mesh with bevel gear 9, with which the power-transmitting reversing gears 29, 30 also mesh, as heretofore explained. The elevator will be swung to the right or left depending upon which gear 29 or 30 is in mesh with the intermediate gear 9.

Engagement of the bevel gear 99 with gear 9 turns the shaft 98 and worm 97 (Figs. 5, 7 and 12) in mesh with worm wheel 96 near the forward end of the bottom 1 of the machine.

A vertical shaft 94 supports the worm wheel 96 and a sprocket 93 driven thereby, around which sprocket is passed a sprocket chain 91 (best shown in Fig. 5), the ends of which, after passing around idler spacing pulleys 92 located at the opposite corners of the front end of the bottom 1 of the machine, are fastened to the crossbar 72 on the bottom 78 of the elevator.

Rotation of the sprocket 93 in one direction or the other, operates through the chain 91, to swing the elevator to one side or the other.

Changes other than those hereinbefore suggested, may be made in the form and arrangement of the several parts described, without departing from the spirit and scope of my invention.

What is claimed is:

1. In a loading machine, the combination with a body portion and a motor; of an elevator pivotally mounted on the body portion to be swung to one side or the other, the receiving end of the elevator being pivoted to the main portion thereof to swing in a vertical plane; means including a transverse winding shaft mounted on the elevator to raise and lower the receiving end of the elevator; a vertical drive shaft driven by the motor, and extending in line with the axis of rotation of the elevator; opposed gears mounted on the drive shaft; a connecting shaft carried by the elevator to travel therewith; gearing connecting the last-named shaft with the winding shaft; and a gear on the opposite end of the shaft adapted to lie in the path of the opposed gears, irrespective of the position to which the elevator may be swung.

2. A self-contained loading machine, including a body portion; supporting wheels therefor; a traction chain suitably fastened at its ends; a sprocket on the machine in engagement with the traction chain; an elevator pivotally supported on the body portion, and including an endless elevating conveyor, the receiving end of the elevator being pivoted to the main portion thereof; a discharging conveyor; a single motor; means driven by the motor to transmit power to the traction wheels or to the sprocket, and to the discharge conveyor; and other means driven by the motor to raise and lower the receiving end of the elevator, actuate the endless elevating conveyor, and swing the elevator to one side or the other.

3. A loading machine comprising a main frame mounted upon wheels and provided with the loading mechanism including an elevator, a motor mounted upon the main frame, a traction chain secured at opposite ends, a sprocket wheel mounted upon the main frame and engaging said chain, and gearing between said motor, said sprocket wheel and supporting wheels of the machine whereby to positively drive the sprocket wheel and supporting wheels, said gearing including independent clutches associated with the sprocket wheel and supporting wheels, respectively, a single clutch lever engaging both clutches to effect simultaneous movement thereof whereby to throw one into gear and the other out of gear, a shift lever in engagement with the first mentioned lever to effect positive movement thereof in each direction, a latch carried by the shift lever, and stops on the first mentioned lever adapted to cooperate with said latch for securing both levers in the required adjusted position.

4. A loading machine comprising a main frame mounted upon wheels and provided with the loading mechanism including an elevator, a motor mounted upon the main frame, a traction chain secured at opposite ends, a sprocket wheel mounted upon the main frame and engaging said chain, and gearing between said motor, said sprocket wheel and supporting wheels of the machine whereby to positively drive the sprocket wheel and supporting wheels, said gearing including independent clutches associated with the sprocket wheel and supporting wheels, respectively, a clutch lever in engagement with both clutches to effect simultaneous movement thereof, and having a longitudinal slot, a transverse lever pivoted at one end and provided with a pin passing through the slot of the first mentioned lever, a latch pivoted upon said pin and having opposed catches, a spring in cooperative relation with the latch, and stops upon the first mentioned lever at the ends of the slot thereof to cooperate with the catches of the latch, whereby to hold both levers in the required adjusted position.

5. In a loading machine of the character specified, a main frame, an elevator comprising main and pivoted sections, the main section being supported at opposite ends upon the main frame and the pivoted section extending forwardly of the main frame, and a folding conveyor pivoted to the main frame below the delivery end of the elevator and adapted to fold against the rear end of the main frame and in conjunction with the pivoted section of the elevator providing for materially reducing the length of the machine.

In testimony whereof I affix my signature.

ISIDOR S. HOCHREITER.